July 30, 1963 M. L. EDWARDS 3,099,016
HEART VALVE
Filed Aug. 11, 1960
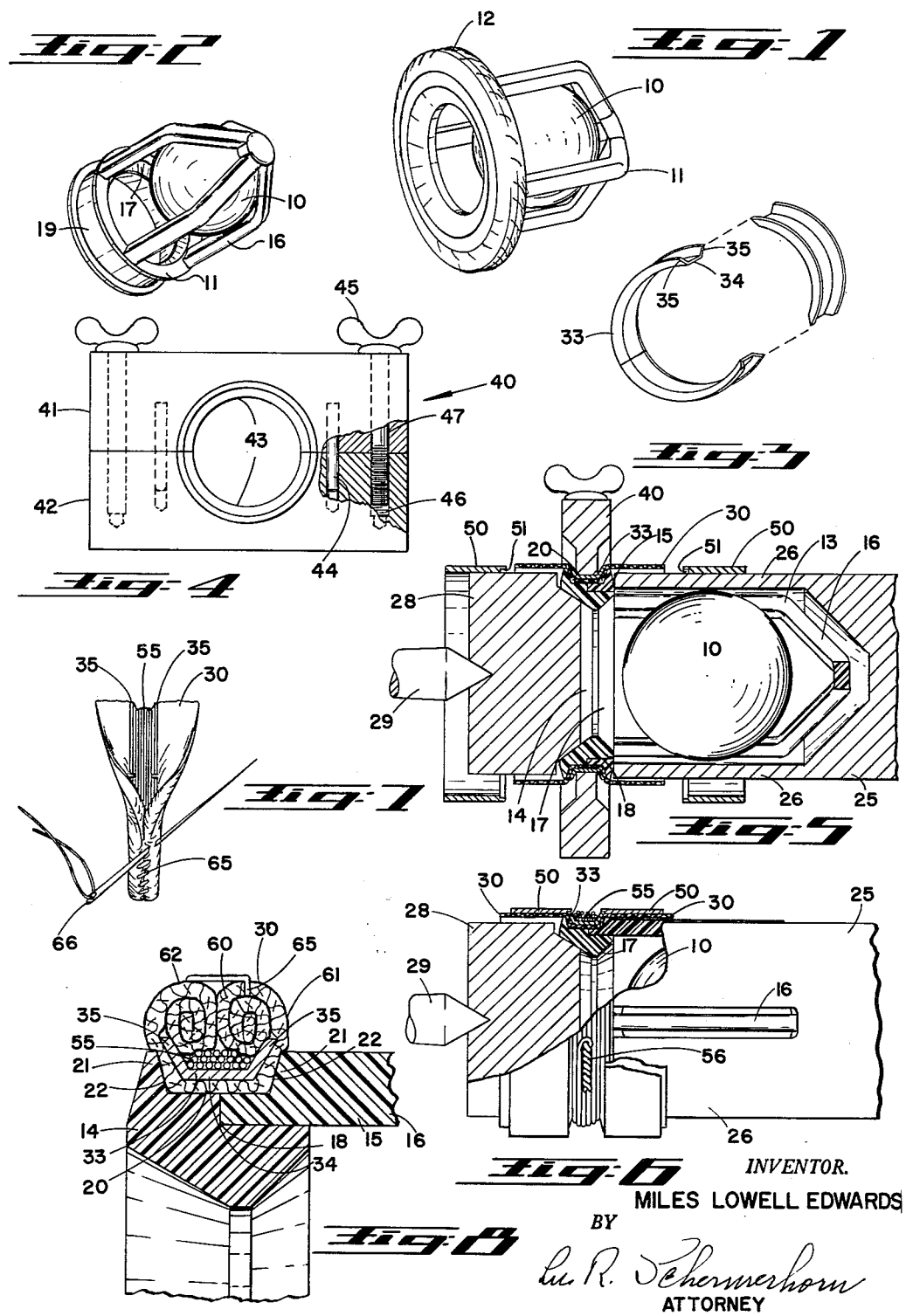
INVENTOR.
MILES LOWELL EDWARDS
BY
Lu. R. Schermerhorn
ATTORNEY United States Patent Office 3,099,016
Patented July 30, 1963

3,099,016
HEART VALVE
Miles Lowell Edwards, 13191 Sandhurst Place,
Santa Ana, Calif.
Filed Aug. 11, 1960, Ser. No. 49,044
6 Claims. (Cl. 3—1)

This invention relates to a valve to be installed in a human heart by cardiac surgery.

In many patients the malfunctioning of one or more of the heart valves may be either the sole cause or an important cause of the patient's heart ailment. The heart valves may be damaged by disease or abnormal from other causes so as to impair the function of the heart in pumping blood through the various organs and tissues of the body. It has been found possible through cardiac surgery to replace the original natural valve structure with a permanent artificial valve which will substantially restore the normal function of the heart.

The substitution of an artificial valve, however, creates many problems. It is, of course, desired that the artificial valve continue to function satisfactorily for the normal life of the patient without any further surgery. The materials used must be compatible with the chemicals in the human body and must not be corroded or affected deleteriously in any way thereby. There can be no parts that deteriorate in such environment within the expected life of the patient, or that might wear out so as to require replacement. A very critical problem is that of providing suitable means of connection with the body tissue to hold the artificial device mounted permanently in operative position. The mounting means must also be of a nature which is adaptable to surgical techniques with a minimum of shock to the patient.

The general object of the present invention is, therefore, to provide an artificial valve which will suit the above and other requirements for incorporation by surgery into the body of a living person.

Other and more specific objects are to provide a valve which may be substituted for any of the major valves of the heart, to provide a valve which is specially adapted to be sewn into permanent union with living tissue, and to provide a valve having a special base construction equipped with a sewing ring to receive surgical sutures and the like.

The present device preferably comprises a ball and cage, although the important features of the invention are also adaptable to other types of valves such as flap valves. In the present instance the cage comprises a part of a valve body having an annular base with a port opening which forms a seat for the ball. A ring of fabric material is secured in an annular groove around the base with portions of the fabric material forming an annular pad to protrude sufficiently to receive a needle for sewing purposes. When the valve is installed this ring pad is sewed to an annular wall of living tissue which has been prepared to receive it. After the operation, the living tissue grows into close union with the fabric material of the valve body to substantially seal the joint and cause the flow of blood to pass through the port of the artificial valve.

Other objects and advantages will become apparent and the invention will be better understood with reference to the following detailed description of the preferred embodiment illustrated on the accompanying drawing. Various changes may be made, however, in the details of construction and all such modifications within the scope of the appended claims are included in the invention.

In the drawing:

FIGURE 1 is an enlarged perspective view of a complete valve embodying the principles of the invention;

FIGURE 2 is a perspective view of the ball and cage in assembled relation prior to installation of the sewing ring;

FIGURE 3 is a perspective view of the three-part clamp ring used for anchoring the fabric material to the valve body;

FIGURE 4 is a view of a screw clamp used to hold the three-part clamp ring in position on the valve body temporarily during assembly;

FIGURE 5 is a view in longitudinal section showing the above parts mounted in a lathe;

FIGURE 6 is a view similar to FIGURE 5 showing a subsequent stage in construction;

FIGURE 7 is a fragmentary view showing another stage in construction; and

FIGURE 8 is an enlarged fragmentary sectional view of the finished base portion shown in FIGURE 2.

The preferred embodiment of valve shown in FIGURE 1 comprises a resilient silicone rubber ball 10, a rigid valve body 11 and a sewing or suture ring 12 of suitable material to receive a needle and thread or suture. For convenience in assembly, the body 11 is made in two parts 13 and 14 as shown in FIGURES 5, 6 and 8. The part 13 comprises a cage ring 15 having an integral ball cage 16 to confine the ball valve element 10. The ring 14 is a port ring which is equipped with a conical or spherical ball seat surface 17. The two rings 14 and 15 fit together in a shouldered joint 18 which is permanently secured in assembly after the ball has been inserted in the cage, the ring 14 retaining the ball in the cage.

The two parts 13 and 14 may be made of any suitable relatively inert and noncorrodible material such as plastic or stainless steel which may be readily molded or cast to the desired shape. The use of plastic has certain advantages such as low cost molding and the facility with which the joint 18 may be permanently united by a suitable adhesive. Various types of nontoxic plastic may be used, such as DuPont Lucite acrylic resin, Rohm and Haas Plexiglas acrylic plastic, and the like.

When the rings 14 and 15 are fitted together, they form a base ring for the body 11 having an outwardly facing annular spool-shaped channel 19 with a bottom surface 20 which is flat in an axial direction and flanges 21 having interior flange surfaces 22 which are divergent outwardly at small angles to radial planes. The joint 18 intersects the bottom channel surface 20 so that one of the flanges 21 is on the ring 14 and the other flange 21 is on the ring 15. These features are best shown in FIGURE 8, while FIGURE 2 shows the ball and body 11 thus assembled prior to installation of the sewing ring 12.

In the next step of manufacture, the ball and cage unit shown in FIGURE 2 is mounted in a lathe as shown in FIGURE 5. A special chuck 25 has legs 26 which extend between the arms of cage 16 to engage and support the ring 15. This chuck is carried by the head stock of the lathe and adapted to be rotated thereby. A circular plug-shaped chuck 28 engages and supports the ring 14 from the lathe dead center 29.

A layer of cloth material 30 is then wrapped around the channel 19, which material instead of being a flat strip may, if desired, be formed as a short sleeve of suitable dimensions for the purpse. The cloth should be made entirely of a synthetic fiber, such as DuPont Teflon, and it is preferably manufactured as a rather finely knitted fabric.

In the next step of assembly, the fabric sleeve is clamped in the bottom of the channel 19 by the three-part stainless steel interrupted clamp ring 33 shown in FIGURE 3. Ring 33 is channel-shaped in cross section having a bottom wall 34, which is flat in an axial direction and divergent side flanges 35. Flanges 35 are inclined from a radial plane at angles which are approximately 15° larger than the angles of inclination of the channel flange surfaces 22. The interrupted ring 33 is sufficiently narrower than the channel 19 to fit within said channel with the cloth clamped between the parts as shown. The 15° convergence between the outer surface of each flange 35 and the inner surface 22 of each flange 21 causes the cloth to be pinched and tightly clamped between the peripheral portions of these flanges in addition to the broad surface clamping action exerted on the cloth between the channel bottom walls 20 and 34, as best shown in FIGURE 8. This is desirable in order to prevent any looseness or gaps between the peripheral portions of the confronting flange surfaces.

Interrupted ring 33 is temporarily clamped in the manner just described by the mechanical clamp 40 shown in FIGURE 4. Clamp 40 comprises upper and lower clamp blocks 41 and 42 of identical shape, each having a semicircular recess 43 to fit the bottom of the channel in segmental ring 33. Clamp blocks 41 and 42 are maintained in alignment by a pair of dowel pins 44 so that they may be tightened together by a pair of thumbscrews 45 engaging threaded bores 46 in the block 42. These screws turn loosely in smooth bores 47 in block 41. FIGURE 5 shows the clamp 40 applied to the interrupted ring 33 to clamp the cloth in the channel of the base member.

Also appearing in FIGURE 5 are a pair of circular collars 50, each having an undercut annular groove 51 in one end. In the next step of assembly, the collars 50 are moved toward each other over the cloth 30 until the outer edges of flanges 35 of the interrupted ring 33 are received within the groove 51. Collars 50 then hold the interrupted ring in place with the cloth properly clamped and clamp 40 is removed. The parts are accurately dimensioned to produce the proper compression of the cloth as above described and eliminate any crack or crevice between the peripheral portions of the flanges without overstressing the plastic flanges 21. Thus, the interrupted ring 33 may be referred to as a spreader ring.

In the next step of assembly, the channel of segmental ring 33 is wound tightly with two or three layers of fine stainless steel wire or other non-corrosive filamentary material 55, as shown in FIGURE 6, accomplished by operation of the lathe. The wire is cut from its source of supply and the cut end is secured preferably by looping it around a bight in the starting end and then leading both ends in opposite directions to the opposite side of the channel and twisting them together in a pigtail knot 56 which has a natural tendency to lie flat on top of the wire winding as shown. Collars 50 are then pulled away from the interrupted ring 33, freeing the ends of the cloth sleeve. The ring ends adjacent the interruptions fit against each other without a gap when thus clamped by the wire or other filament.

In the next step of manufacture, the ends of the cloth 30 are folded under as shown at 60 in FIGURE 8 to provide several thicknesses of cloth in the channel on top of the wire winding 55. In rolling under the ends 60, the portions 61 which are emergent from the clamp applied by the flanges 21 and 35, are pulled toward each other so that the cloth will not bulge out loosely at 61, causing substantially all of the free portions of the material to be contained in rolls and folds overlying the channels and the wire binding. This manipulation is performed progressively around the ring and, at the same time, the inwardly directed folds and rolled portions 62 are sewed together with stitches 65 from a needle and thread 66, as shown in FIGURE 7. After the folding and rolling and the sewing have been completed to provide a series of stitches 65 completely around the channel base, the sewing is prefrably continued to form a cross stitch around the entire perimeter. The sewing ring 12 is then complete and the finished valve appears as shown in FIGURE 1.

The folding and sewing of the cloth as above described produces a firm annular tuft projecting radially outward from its rigidly held and anchored portions between the peripheral edges of flanges 21 and 35 a sufficient distance to provide a pad which the surgeon can penetrate with his needle when the valve is sewed in the opening of living tissue of the heart. If care is taken to avoid a large loose fold at 61, the resulting pad or tuft will be firm enough to prevent flexing when hydraulic pressure is exerted against the valve since the pinched portions of the cloth stabilize and secure opposite sides of the base of the pad against movement.

In the mitral position, for example, the sewing ring 12 is sewed to the mitral ring of the heart with the ball cage 16 contained within the adjacent heart chamber. The valve may also be used in other positions where the ball cage projects into one of the aterial tubes. In any position, of course, the function of the artificial valve is merely to serve as a check valve to prevent back flow, in substitution for the defective natural valve which nature intended to perform this function. Prior to installing the valve, the surgeon removes damaged valve tissue and other obstructions to clear the port and passage for the present artificial valve. The sewing ring is then sewed or sutured securely to the heart tissue around the opening so that the entire flow of blood through such opening must pass through the port of the base ring of valve body 11.

The sewing ring, although firm enough to resist objectionable yielding under existing hydraulic pressures, is at the same time soft and resilient enough to provide inherent adjustability to the size of the opening. When the opening is small the surgeon sews deeply into the pad, inserting his needle closely adjacent to the flanges 21 and 35. On the other hand, when the opening is large, the needle and suture may be passed through peripheral portions of the pad outward from flanges 21 and 35, pulling and distending the cloth radially outward to some extent to fit the opening.

In the process of healing, the live tissue grows into the mesh of the fabric forming a permanent union with the sewing ring independent of the sutures applied by the surgeon. The sutures eventually dissolve and disappear without any impairment to the security of the union with the natural tissue. For the same reason, the stitches 65 may be of ordinary cotton thread, the pad itself being permanent and self-sufficient without these stitches after healing and new tissue growth as above described.

A resilient material is used for the ball in preference to a hard material for two principal reasons. A resilient material is more quiet in operation and is less damaging to blood corpuscles which may become squeezed between the ball and its seat each time the valve closes. A closed cage is desirable as it prevents the sutures from becoming looped around a cage leg when the surgeon is working in a very restricted space in an almost inaccessible position with a minimum incision.

Having now described my invention and in what manner the same may be used, what I claim as new and desire to protect by Letters Patent is:

1. A heart valve comprising: a valve body; a movable valve member contained in said body; a suturing ring for connecting said valve body with the heart tissues by sutures, said suturing ring surrounding and being connected with said valve body and having a circular periphery radially outstanding from the valve body and having a substantial axial extent; said suturing ring comprising a layer of fabric folded upon itself to provide said substantial axial extent of said suture ring.

2. A heart valve comprising a body having a valve port and a valve member therein and an outwardly facing channel surrounding said port, a cloth secured at its midportion in said channel, and means securing end portions of said cloth folded over said channel to form an annular sewing ring around said body.

3. A heart valve comprising a circular valve body having a valve member, a cloth having a portion disposed against said body, means securing said portion of said cloth around said body, and an annular pad around said body comprising other portions of said cloth folded to multiple thickness.

4. A heart valve comprising a circular valve body defining a valve port with an outwardly facing channel therearound, a movable valve member cooperating with said port, a cloth sleeve having its mid-portion disposed in the bottom of said channel, an interrupted channel ring clamping said mid-portion of said cloth in said channel, a filamentary winding securing said channel ring in clamping relation against said cloth, and stitches securing opposite end portions of said cloth reversely rolled and folded on top of said winding to form a firm annular pad projecting outwardly from said channel and channel ring.

5. A heart valve comprising a circular valve body having a valve port therein and an outwardly facing channel therearound, a movable valve member cooperating with said port, a cloth sleeve having its mid-portion disposed in the bottom of said channel, an interrupted spreader ring clamping said mid-portion of said cloth in the bottom of said channel, flanges on said spreader ring pinching said cloth against opposite peripheral edges of said channel without any gaps between said flanges and said edges of said channel, means securing said spreader ring in clamping relation against said cloth, and stitches securing opposite end portions of said cloth reversely rolled and folded on top of said securing means to form a firm annular pad projecting outwardly from said channel and spreader ring.

6. A heart valve comprising a circular valve body defining a valve port with an outwardly facing channel therearound, a movable valve member cooperating with said port, a cloth having a portion intermediate its ends disposed in the bottom of said channel, an interrupted channel ring clamping said cloth in said channel, and means securing said channel ring in clamping relation against said cloth, portions of said cloth projecting from opposite sides of said channel being stitched together to form a suturing ring.

References Cited in the file of this patent

UNITED STATES PATENTS

| 1,342,054 | Michalovsky | June 1, 1920 |
| 2,404,020 | Akerman | July 16, 1946 |
| 2,571,721 | Jardon | Oct. 16, 1951 |
| 2,682,057 | Lord | June 29, 1954 |

OTHER REFERENCES

Annals of Surgery, volume 147, No. 5, May 1958, pages 636–645. (Copy in Scientific Library.)